US012086374B2

(12) United States Patent
Clement et al.

(10) Patent No.: US 12,086,374 B2
(45) Date of Patent: Sep. 10, 2024

(54) SYSTEMS AND METHODS FOR DISPLAYING AND INTERACTING WITH A DYNAMIC REAL-WORLD ENVIRONMENT

(71) Applicant: Nearme AR, LLC, Boulder, CO (US)

(72) Inventors: Ronald Dale Clement, Boulder, CO (US); Elaine Terese Clement, Boulder, CO (US)

(73) Assignee: NEARME AR, LLC, Boulder, CO (US)

( * ) Notice: Subject to any disclaimer, the term of this patent is extended or adjusted under 35 U.S.C. 154(b) by 0 days.

(21) Appl. No.: 17/703,690

(22) Filed: Mar. 24, 2022

(65) Prior Publication Data
US 2022/0222903 A1 Jul. 14, 2022

Related U.S. Application Data

(60) Division of application No. 16/795,136, filed on Feb. 19, 2020, now Pat. No. 11,302,079, which is a (Continued)

(51) Int. Cl.
*G06T 19/00* (2011.01)
*G06F 3/01* (2006.01)
(Continued)

(52) U.S. Cl.
CPC .......... *G06F 3/04815* (2013.01); *G06F 3/011* (2013.01); *G06F 3/04842* (2013.01);
(Continued)

(58) Field of Classification Search
CPC .... G06T 19/006; H04N 21/4223; G06K 9/22; G06F 3/011
See application file for complete search history.

(56) References Cited

U.S. PATENT DOCUMENTS

2010/0185529 A1  7/2010  Chesnut et al.
2011/0246276 A1  10/2011  Peters et al.
(Continued)

FOREIGN PATENT DOCUMENTS

WO  2014182545 A1  11/2014

OTHER PUBLICATIONS

International Search Report and Written Opinion dated Mar. 28, 2018 in PCT Application No. PCT/US18/14644, filed Jan. 22, 2018, 10 pages.

(Continued)

*Primary Examiner* — Samantha (Yuehan) Wang
(74) *Attorney, Agent, or Firm* — Berg Hill Greenleaf Ruscitti LLP

(57) ABSTRACT

Methods generate a dynamic real-world environment with at least one interactive ARBit. Environment information captured from a real-world environment is received from a mobile computing device. The environment information is processed to determine identified features corresponding to the real-world environment and the dynamic real-world environment is generated based upon the identified features. An ARBit database is searched for ARBits that match the identified features and the matched ARBits are added to an ARBit collection. The dynamic real-world environment and the ARBit collection are sent to the mobile device. A user of the mobile device interacts with the dynamic real-world environment and at least one displayed ARBit of the ARBit collection.

13 Claims, 9 Drawing Sheets

Related U.S. Application Data continuation of application No. 15/864,935, filed on Jan. 8, 2018, now Pat. No. 10,593,117.

(60) Provisional application No. 62/517,593, filed on Jun. 9, 2017.

(51) Int. Cl.
| | |
|---|---|
| *G06F 3/04815* | (2022.01) |
| *G06F 3/04842* | (2022.01) |
| *G06V 10/10* | (2022.01) |
| *G06V 20/20* | (2022.01) |
| *H04N 21/234* | (2011.01) |
| *H04N 21/258* | (2011.01) |
| *H04N 21/262* | (2011.01) |
| *H04N 21/422* | (2011.01) |
| *H04N 21/4223* | (2011.01) |
| *H04N 21/472* | (2011.01) |
| *H04N 21/4725* | (2011.01) |
| *H04N 21/81* | (2011.01) |

(52) U.S. Cl.
CPC ............ *G06T 19/006* (2013.01); *G06V 10/17* (2022.01); *G06V 20/20* (2022.01); *H04N 21/23418* (2013.01); *H04N 21/25841* (2013.01); *H04N 21/262* (2013.01); *H04N 21/42201* (2013.01); *H04N 21/42203* (2013.01); *H04N 21/4223* (2013.01); *H04N 21/47202* (2013.01); *H04N 21/47205* (2013.01); *H04N 21/4725* (2013.01); *H04N 21/816* (2013.01)

(56) References Cited

U.S. PATENT DOCUMENTS

| | | |
|---|---|---|
| 2012/0004956 A1 | 1/2012 | Huston et al. |
| 2012/0263154 A1* | 10/2012 | Blanchflower ....... G06T 19/006 455/414.1 |
| 2013/0178257 A1 | 7/2013 | Langseth |
| 2013/0272574 A1 | 10/2013 | Cohen |
| 2014/0160161 A1 | 6/2014 | Barreiro et al. |
| 2015/0234477 A1* | 8/2015 | Abovitz .............. G06F 3/04883 382/103 |
| 2015/0310667 A1 | 10/2015 | Young et al. |
| 2015/0348326 A1 | 12/2015 | Sanders et al. |
| 2016/0027215 A1 | 1/2016 | Burns et al. |
| 2016/0133230 A1 | 5/2016 | Daniels et al. |
| 2017/0053447 A1* | 2/2017 | Chen ..................... G06T 19/006 |
| 2018/0335308 A1* | 11/2018 | Zavesky ............ G01C 21/3676 |
| 2018/0357824 A1 | 12/2018 | Wu et al. |

OTHER PUBLICATIONS

International Preliminary Report on Patentability dated Dec. 10, 2019, 9 pages.
European Supplementary Search Report dated Jan. 19, 2021, 14 pages.
Canadian Examination Search Report in counterpart CA application No. 3,067,417, dated Mar. 15, 2022, 6 pages.
Canadian Examination Search Report in counterpart CA application No. 3,067,417, dated Jan. 19, 2023, 3 pages.
Examination Report received in counterpart EP application No. 18812862.3, dated Mar. 10, 2023, 6 pages.
Chinese Notification of First Office Action received in counterpart CN application No. 201880037891.4, dated Dec. 22, 2022, 18 pages.

* cited by examiner

SYSTEMS AND METHODS FOR DISPLAYING AND INTERACTING WITH A DYNAMIC REAL-WORLD ENVIRONMENT

CROSS REFERENCE TO RELATED APPLICATIONS

This application is a divisional application of U.S. application Ser. No. 16/795,136, filed Feb. 19, 2020, now U.S. Pat. No. 11,302,079, which is a continuation of U.S. application Ser. No. 15/864,935, filed Jan. 8, 2018, now U.S. Pat. No. 10,593,117 and claims priority to U.S. Application No. 62/517,593, titled "Systems and Methods for Displaying and Interacting with a Dynamic Real-World Environment", filed Jun. 9, 2017. The entire disclosures of each are hereby incorporated by reference.

SUMMARY

One aspect of the present embodiments includes the realization that replay of a video is not dynamic and therefore becomes repetitive. The present embodiments solve this problem by identifying features within the captured video and generating a dynamic environment corresponding to the identified features and adding one or more ARBits to the environment based upon a location of the mobile device viewing the dynamic environment. A user of the mobile device may interact with the one or more ARBits while viewing the dynamic environment. Accordingly, the dynamic environment may have different content based upon the location of the mobile device viewing the dynamic environment.

In one embodiment, a method displays and interacts with a dynamic real-world environment. Information of an environment is captured using one or more of a camera, a microphone, and a locator of a mobile computing device. The information is sent to a server and the dynamic real-world environment and at least one ARBit are received from the server. A view of at least part of the dynamic real-world environment containing the ARBit is displayed to the user and manipulated based upon user input. In response to selection of the ARBit within the view by the user, interaction with the user is based upon a type of the ARBit.

In another embodiment, a method generates a dynamic real-world environment with at least one interactive ARBit. Environment information captured from a real-world environment is received from a mobile computing device. The environment information is processed to determine identified features corresponding to the real-world environment and the dynamic real-world environment is generated based upon the identified features. An ARBit database is searched for ARBits that match the identified features and the matched ARBits are added to an ARBit collection. The dynamic real-world environment and the ARBit collection are sent to the mobile device.

In another embodiment, a method enhances, based upon a current location of a mobile device, a previously generated dynamic real-world environment. A current location and a request to enhance the dynamic real-world environment is received from a mobile device. An ARBit database is searched for ARBits that match previously identified features corresponding to the dynamic real-world environment and the matched ARBits are added to an ARBit collection and the ARBit collection is sent to the mobile device for replay within the dynamic real-world environment.

DETAILED DESCRIPTION OF THE EMBODIMENTS

Figure 1:
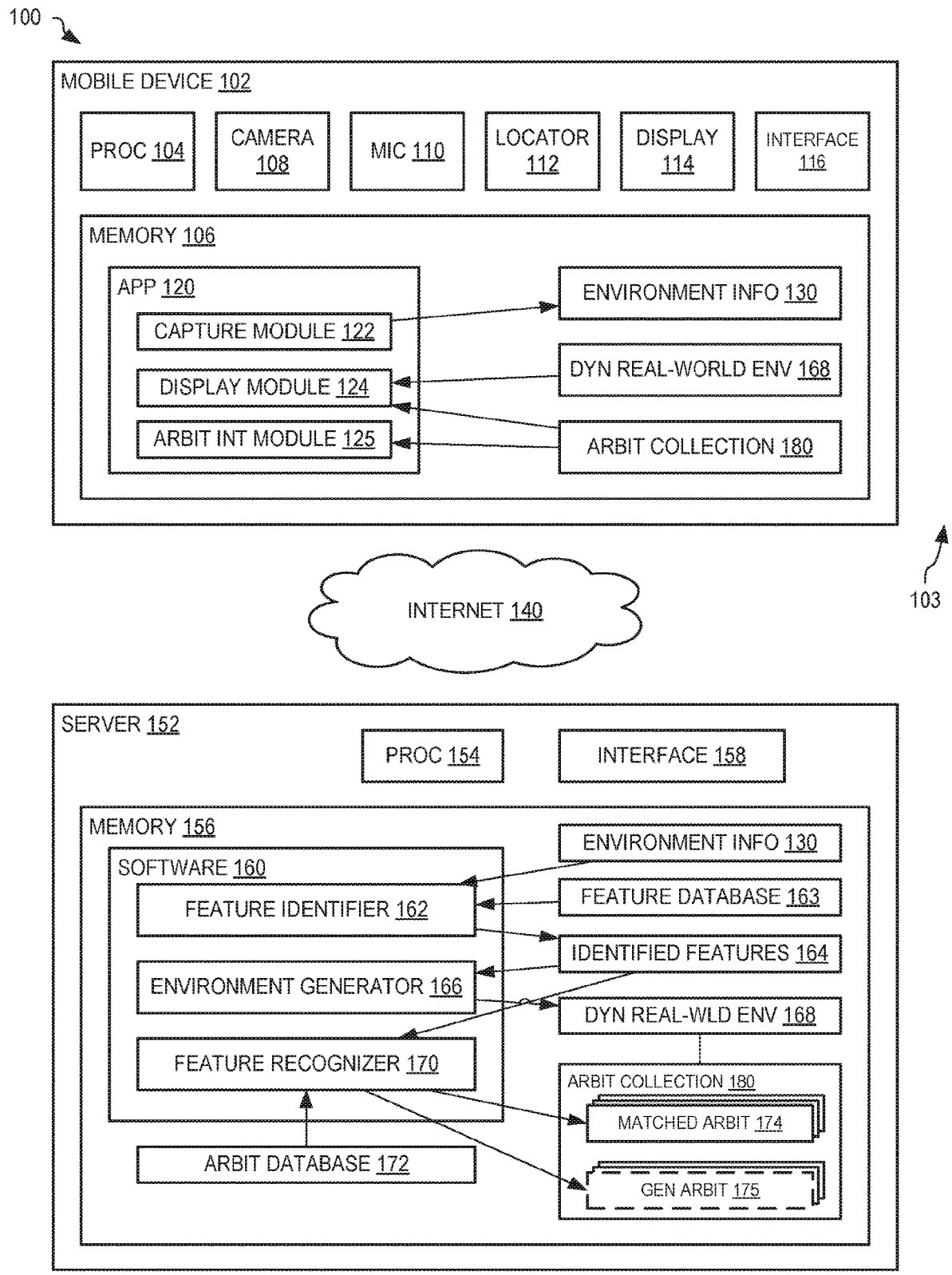
FIG. 1 shows one example system for displaying and interacting with a dynamic real-world environment, in an embodiment.

FIG. 1 shows one example system 100 for displaying and interacting with a dynamic real-world environment. Mobile device 102 is for example a device selected from the group including a smartphone, a tablet, a laptop, and so on. Mobile device 102 includes a processor 104, memory 106, a camera 108, a microphone 110, a locator 112, a display 114, and a communication interface 116. In one embodiment, locator 112 is a GPS receiver that wirelessly determines its location. Display 114 provides an interactive interface for a user of mobile device 102 and is for example a touch sensitive LCD display screen. Interface 116 is for example a wireless transceiver capable of implementing one or more of Bluetooth, Wi-Fi, and cellular communication.

Memory 106 stores an app 120 that includes machine readable instructions (e.g., software) that are executed by processor 104 to provide functionality of mobile device 102 as described herein. In particular, app 120 includes a capture module 122 and a display module 124. Capture module 122 controls camera 108, microphone 110, and locator 112 to capture environment information 130 of an environment 103 that mobile device 102 is within. For example, a user of mobile device 102 may move mobile device 102 around within environment 103 while camera 108 captures a plurality of images (and/or video stream) of features within environment 103, while microphone 110 captures audio data of sounds within environment 103, and while locator 112 determines a current location of mobile device 102, to form environment information 130. Thus, environment information 130 may include a sequence of images, audio data, and location information. That is, environment information 130 contains real-world information of environment 103. The more (slower and further the movement of mobile device 102 and/or the longer the capture period) of environment 103 captured by the user using mobile device 102, the greater the detail from environment 103 that is contained within environment information 130. For example, the user may point camera 108 of mobile device 102 towards a horizon and slowly pan through environment 103 to capture environment information 130. Capture module 122 may include other information within environment information 130 without departing from the scope hereof. For example, where mobile device 102 includes sensor(s) (e.g., accelerometers, gyroscopes) for determining movement of mobile device 102, capture module 122 may include this sensor data within environment information 130. Mobile device 102 uses interface 116 to send (e.g., via Internet 140) environment information 130 to a server 152.

Server 152 is one or more computer(s) that includes a processor 154, memory 156, and an interface 158 that facilitates communication with mobile device 102, for example via Internet 140. Memory 156 stores machine readable instructions of software 160 that are executed by processor 154 to provide functionality of server 152 as described herein.

A feature identifier 162 of software 160 processes environment information 130 against a feature database 163 to generate one or more identified features 164 found therein. For example, feature database 163 may define identifiable features as one or more of shape, sound, color, logo, words, location, and so on. In one embodiment, feature identifier 162 includes one or more image and audio processing algorithms that process one or more images within environmental information 130 to identify features 164 based upon features defined within feature database 163. Thus, identified features 164 represent identifiable shapes, sounds and objects found within environment 103, such as bushes, trees and buildings, and may include relative positions to indicate one or more spatial relationships to each other. For example, feature identifier 162 may utilize movement data, when included within environmental information 130, when processing captured images and video sequences to enhance determining of relative positions of features within environment 103.

Where feature identifier 162 does not identify sufficient features 164 within environment information 130, feature identifier 162 may send a message to mobile device 102 inviting the user to use capture module 122 to capture more information of environment 103 and send it to server 152 where it may be combined with existing environment information 130 and further processed by feature identifier 162 to identify more features 164.

An environment generator 166 of software 160 utilizes the identified features 164 to generate a dynamic real world environment 168 that resembles environment 103. For example, based upon features 164, environment generator 166 creates dynamic real world environment 168 as a three-dimensional model that includes features 164 positioned relative to one another. Thus, feature identifier 162 and environment generator 166 cooperate to generate dynamic real-world environment 168 to resemble environment 103. That is, dynamic real-world environment 168 is generated based upon the real-world and objects found therein.

An ARBit is a data item that has one or more characteristics that may be matched to identified features 164, and has one or more associated data item(s) (e.g., data objects) that may be displayed or played on mobile device 102. The ARBit includes a displayable 2D or 3D image (e.g., for display within the dynamic real-world environment 168) and the associated data items may identify or include one or more of a coupon, an ad, a game, an object, an audio file, and a video. Different types of ARBit are described in detail below. A feature recognizer 170 of software 160 compares one or more identified features 164 to ARBits within an ARBit database 172, and, for each features 164 that matches an ARBit within ARBit database 172, feature recognizer 170 may add the matched ARBit 174 to an ARBit collection 180 corresponding to dynamic real-world environment 168. For example, matched ARBit 174 may be assigned a location within dynamic real-world environment 168 corresponding to a location of the identified feature 164 within environment 103. However, matched ARBits 174 and/or generic ARBits 175 are not necessarily associated with a predefined geographic location.

ARBit collection 180 is generated dynamically from identified features 164 and therefore need not be stored permanently within server 152. Feature recognizer 170 may be invoked to regenerate ARBit collection 180 from identified features 164 at any time. Similarly, feature identifier 162 may be invoked to regenerate identified features 164 from environment information 130 at any time. In an alternate embodiment, ARBit collection 180 is stored on server 152 for reuse.

Feature database 163 and ARBit database 172 are related and may be implemented together without departing from the scope hereof. For example, ARBits of ARBit database 172 may be associated with features of feature database 163 to allow these ARBits to be selected for dynamic real-world environment 168 based upon identified features 164 therein. ARBits of ARBit database 182 may each identify or include one or more of a coupon, an ad, a game, an object, an audio file, and a video for a corresponding feature of database 163.

In certain embodiments, where feature recognizer 170 does not match any ARBits of ARBit database 172 to any identified features 164 of environment 103, feature recognizer 170 may add one or more generic ARBits 175 to ARBit collection 180 for dynamic real-world environment 168. In one embodiment, feature recognizer 170 selects one or more generic ARBits 175 from ARBit database 172 based upon a current location of mobile device 102. For example, where mobile device 102 is located near a particular store, feature recognizer 170 selects one or more matched ARBits 174 from ARBit database 172 based upon the store. In another embodiment, based upon one or more identified features 164, feature recognizer 170 may identify one or more generic ARBits 175 from ARBit database 172 through association. For example, where one identified feature 164 is an image of a flower, feature recognizer 170 may select a bumble-bee type matched ARBit 174 for inclusion within ARBit collection 180.

In certain embodiments, feature recognizer 170 may use collected and stored information for how other users are responding to ARBits within their respective ARBit collections. For example, based upon historical information collected by server 152, feature recognizer 170 may prioritize selection of one or more ARBits from ARBit database 172 for including in ARBit collection 180. In one embodiment, feature recognizer 170 may add one or more matched ARBits 174 and one or more generic ARBits 175 to dynamic real-world environment 168. In another embodiment, matched ARBits 174 and generic ARBits 175 form a matrix where a location of mobile device 102 may be used to determine which, if any, of these ARBits will be served.

Environment generator 166 sends dynamic real-world environment 168 and ARBit collection 180 to mobile device 102, for example via interface 158, Internet 140, and interface 116. Within mobile device 102, a display module 124 of app 120 displays at least part of dynamic real-world environment 132 and corresponding ARBits of ARBit collection 180 on display 114 and interacts with the user to manipulate dynamic real-world environment 168 and/or the ARBits of ARBit collection 180 on display 114.

ARBit Types

Each matched ARBit 174 and generic ARBit 175 may be of a particular ARBit type and may have different types of data associated therewith and allow different actions and interactions with the user. The following table provides examples of ARBit types.

| ARBit Type | Description |
| --- | --- |
| Game | ARBit has associated software that provides game functionality on the mobile device. |
| Image | ARBit has associated image data that may be displayed on the mobile device. |
| Video | ARBit has associated video data that may be played on the mobile device. |
| Coupon | ARBit has offer information that may be displayed on the mobile device, printed, etc. |
| Sound | ARBit has associated audio data that may be played on the mobile device. |
| Link to WebSite | ARBit has an associated URL that may display a web page on the mobile device. |

In certain embodiments, matched ARBit 174 and generic ARBit 175 may identify data already stored within app 120 of mobile device. In other embodiments, matched ARBit 174 and generic ARBit 175 include data that may be executed, played, and/or displayed on mobile device 102. For example, where matched ARBit 174 is a game ARBit type, app 120 may execute the code for that game to allow the user to play the game of mobile device 102. In another example, where generic ARBit 175 is an image ARBit type, app 120 may display the image on mobile device 102 when generic ARBit 175 is selected by the user. In certain embodiments, app 120 may include an ARBit interactive module 125 that allows a user of mobile device 102 to interact with each selected matched ARBit 174 and generic ARBit 175.

Figure 2:
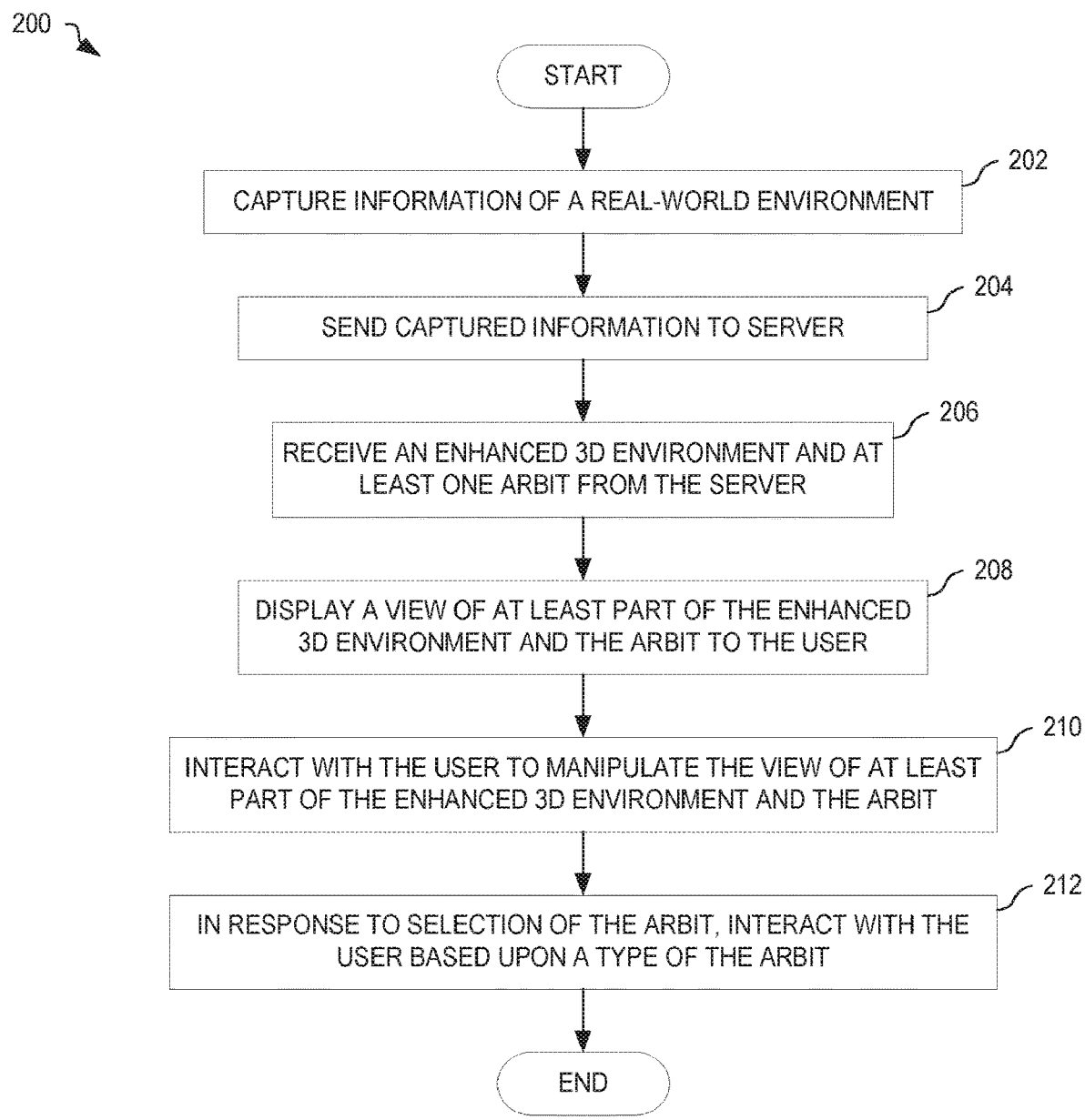
FIG. 2 is a flowchart illustrating one example method for capturing, displaying and interacting with the dynamic real-world environment of FIG. 1, in an embodiment.

FIG. 2 is a flowchart illustrating one example method 200 for capturing, displaying, and allowing a user to interact with dynamic real-world environment 168 of FIG. 1. Method 200 is for example implemented within mobile device 102 of FIG. 1. In step 202, method 200 capture information of a real-world environment. In one example of step 202, capture module 122 of app 120 controls one or more of camera 108, microphone 110 and locator 112 to capture environment information 130 from environment 103. In step 204, method 200 sends the captured information to a server. In one example of step 204, capture module 122 sends environment information 130 to server 152 via interface 116 of mobile device 102, Internet 140, and interface 158 of server 152.

In step 206, method 200 receives an enhanced 3D environment and at least one ARBit from the server. In one example of step 206, app 120 receives dynamic real-world environment 168 and ARBit collection 180 from server 152 and stores it within memory 106. In step 208, method 200 displays a view of at least part of the enhanced 3D environment and the ARBit to the user. In one example of step 208, display module 124 displays a view of at least a part of dynamic real-world environment 168 on display 114 of mobile device 102 and any ARBits of ARBit collection 180 that are located in that part of the dynamic real-world environment 168. In step 210, method 200 interacts with the user to manipulate the view of at least part of the enhanced 3D environment and the ARBit. In one example of step 210, display module 124 interacts, using display 114 to detect one or more touch gestures and or movement (e.g., as detected by accelerometers and gyroscopes) of mobile device 102, with the user of mobile device 102 to manipulate the displayed view of dynamic real-world environment 168 and ARBits of ARBit collection 180 on display 114. In step 212, in response to selection of the ARBit by the user, method 200 interacts with the user based upon a type of the ARBit. In one example of step 212, when the user taps on one of matched ARBit 174 or generic ARBit 175 displayed within the view of dynamic real-world environment 168 on display 114 (e.g., see FIG. 5), display module 124 invokes an interaction based upon the type of the tapped ARBit. For example, where the user taps on generic ARBit 175 within the displayed portion of dynamic real-world environment 168 on display 114, and a type of generic ARBit 175 is video, the corresponding video content is shown on display 114. In another example, where the user taps on matched ARBit 174 within the displayed portion of dynamic real-world environment 168 on display 114, and a type of matched ARBit 174 is game, the corresponding game is loaded onto mobile device 102 such that the user may play it.

Figure 3:
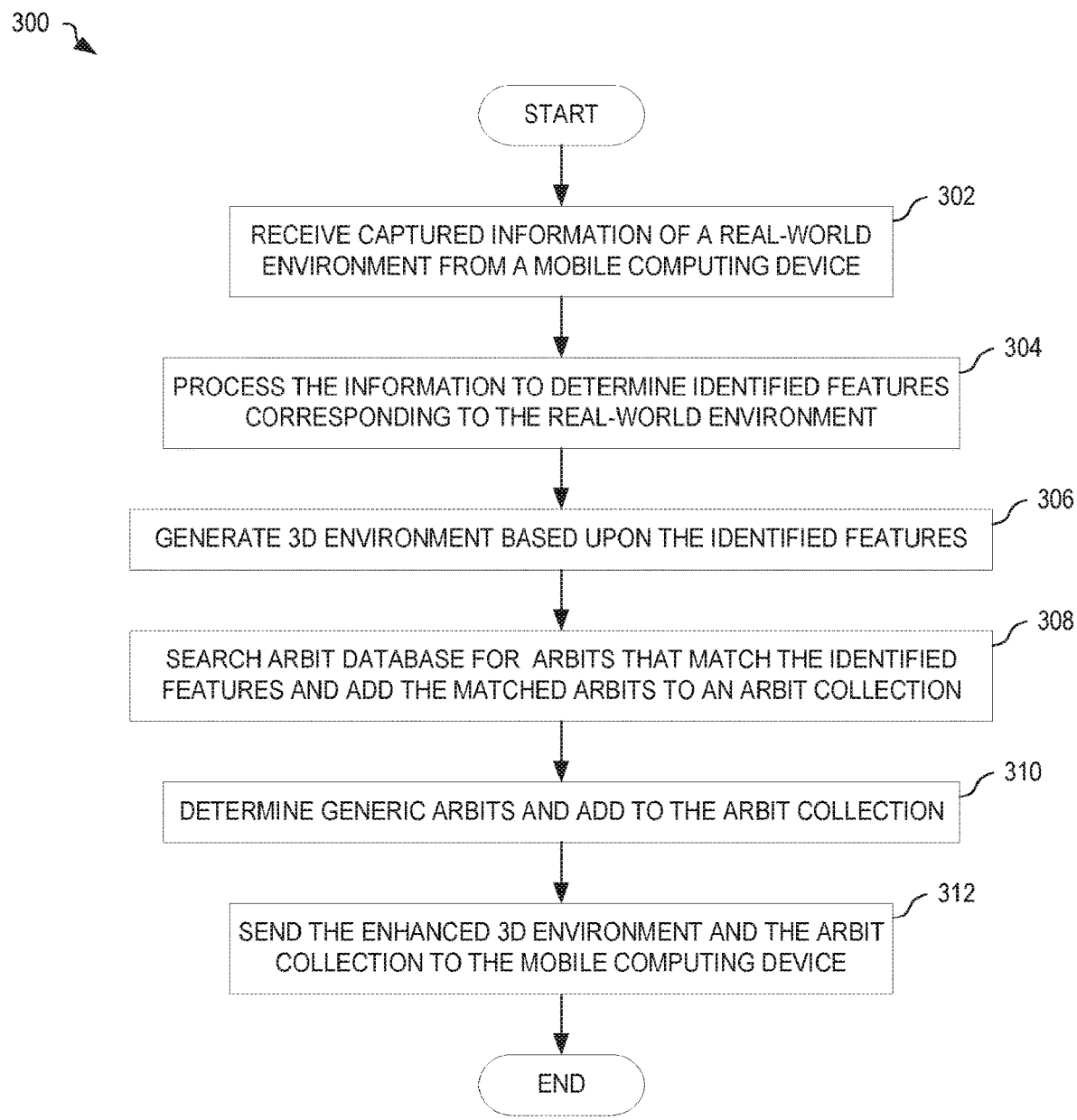
FIG. 3 is a flowchart illustrating one example method for generating the dynamic real-world environment of FIG. 1, in an embodiment.

FIG. 3 is a flowchart illustrating one example method 300 for generating the dynamic real-world environment of FIG. 1. Method 300 is for example implemented within server 152 of FIG. 1.

In step 302, method 300 receives captured information of a real-world environment from a mobile computing device. In one example of step 302, server 152 receives environment information 130 from mobile device 102 (e.g., as sent by step 204 of method 200, FIG. 2) and stores environment information 130 in memory 156. In step 304, method 300 processes the information to determine identified features corresponding to the real-world environment. In one example of step 304, feature identifier 162 processes images and sounds of environment information 130 against feature database 163 to generate identified features 164.

In step 306, method 300 generates a 3D environment based upon the identified features. In one example of step 306, environment generator 166 uses identified features 164 to generate dynamic real world environment 168 to resemble environment 103. In step 308, method 300 searches an ARBit database for ARBits that match the identified features and adds the matched ARBits to an ARBit collection. In one example of step 308, feature recognizer 170 searches ARBit database 172 for ARBits that match each identified feature 164, and adds any matched ARBits 174 to ARBit collection 180.

In step 310, method 300 determines generic ARBits and adds them to the ARBit collection. In one example of step 310, where feature recognizer 170 determines that too few matched ARBits 174 have been added to ARBit collection 180, feature recognizer 170 selects one or more generic ARBits 175 from ARBit database 172 based upon a current location of mobile device 102 and adds them to ARBit collection 180.

In step 312, method 300 sends the enhanced 3D environment and the ARBit collection to the mobile computing device. In one example of step 312, server 152 sends dynamic real-word environment 168 and ARBit collection 180 to mobile device 102 via interface 158, Internet 140, and interface 116, where they are received in step 206 of method 200.

In one embodiment, step 304 includes image processing to identify certain patterns that show, or may allow server 152 to predict, a user's interests in real-world products based upon environment information 130. For example, where the user captures images of a logo of a beverage company, feature identifier 162 may identify that logo within environment information 130 and may thereby predict the user's interest in products of that beverage company. This identified interest in real-world products may be used to determine one or more matched ARbits 174 and/or generic ARBits 175 to add to ARBit collection 180. For example, these ARBits 174/175 may provide marketing opportunities for companies wishing to advertise their products using system 100.

Figure 4:
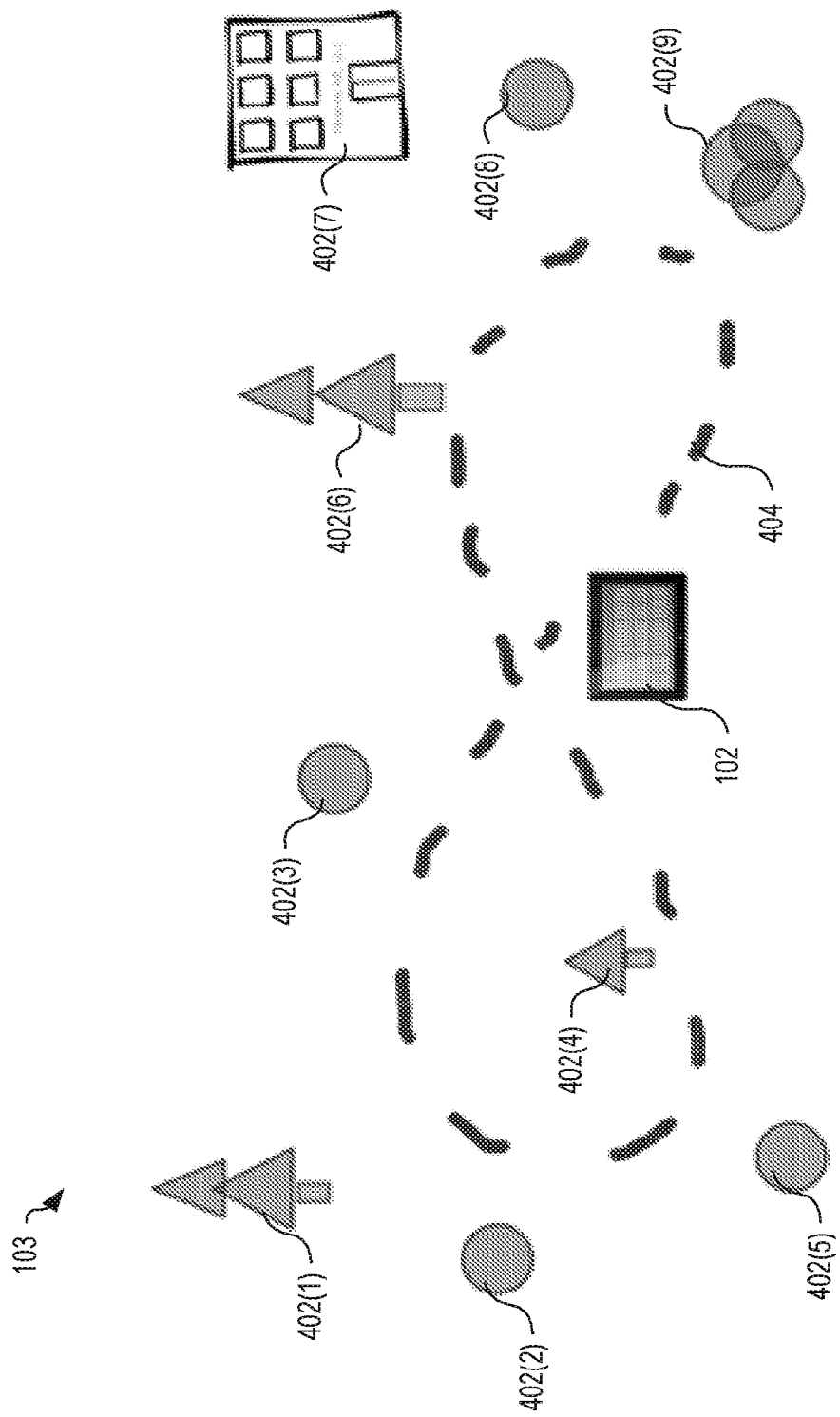
FIG. 4 shows the mobile device of FIG. 1 moving within the environment to capture the environment information of a plurality of objects within the environment.

FIG. 4 shows mobile device 102 of FIG. 1 moving within environment 103 to capture environment information 130 of a plurality of objects 402 within environment 103. For example, from within environment 103, the user moves mobile device 102 in a figure-of-eight path 404 (indicated as a dashed line) while capture module 122 controls (a) camera 108 to capture images of objects 402 within environment 103, (b) microphone 110 to capture audio data of sounds within environment 103, and (c) locator 112 to capture a location of mobile device 102. For example, locator 112 captures a general location of environment 103 and the location of mobile device 102 as the user moves through environment 103 (i.e., the real world). Environment information 130 may thereby contain a sequence of images of objects 402, sounds from environment 103, and location information of mobile device 102 moving through environment 103.

Figure 5:
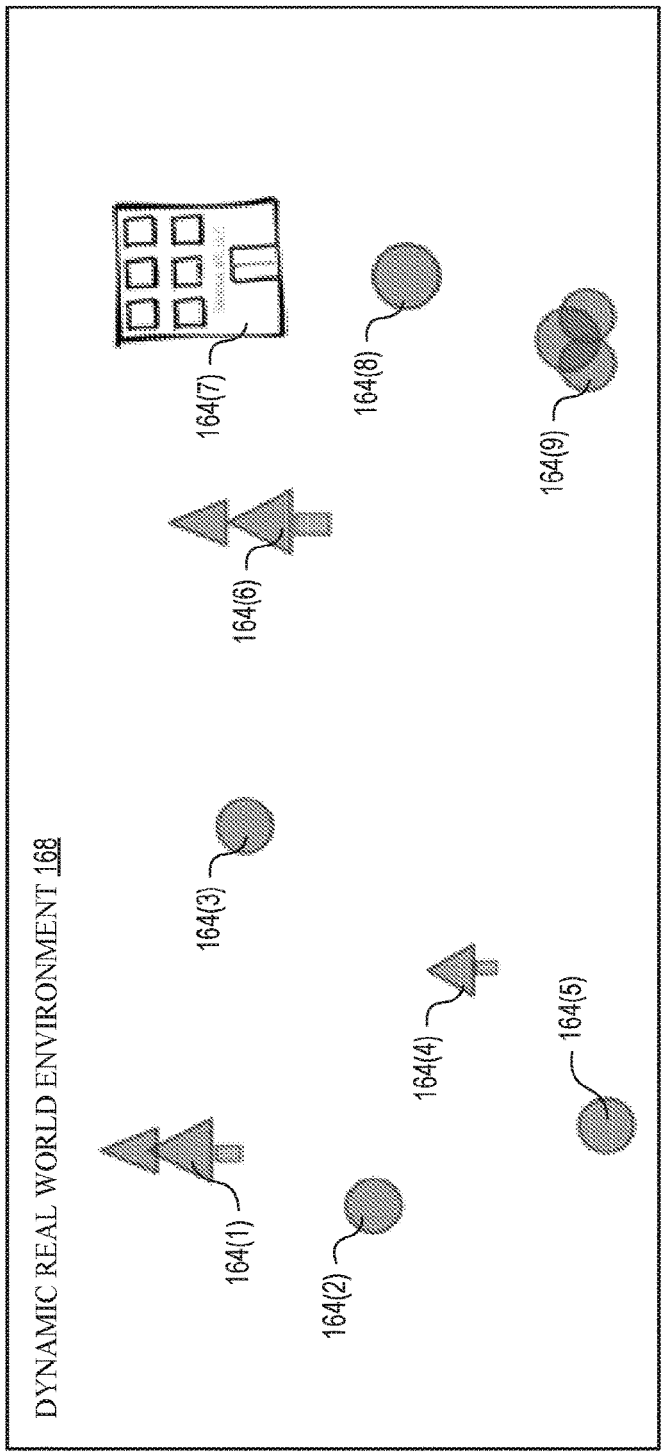
FIG. 5 shows a graphical representation of the dynamic real-world environment and display of FIG. 1 showing a portion of the dynamic real-world environment.
Figure 5:
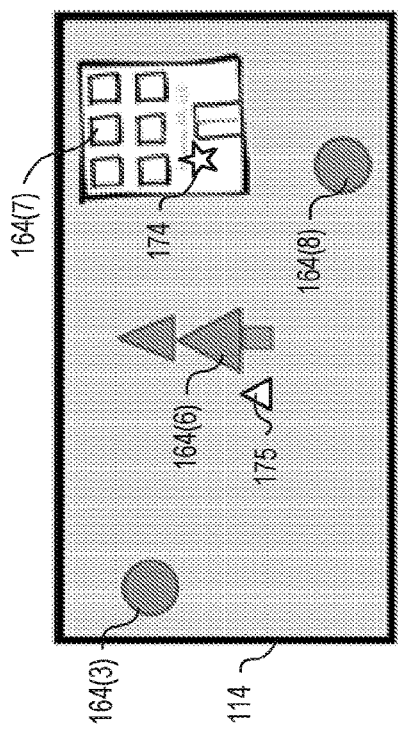

FIG. 5 shows a graphical representation of dynamic real-world environment 168 and of display 114 of FIG. 1 showing a portion of dynamic real-world environment 168. Display 114 may show more or fewer ARBits corresponding to (e.g., within ARBit collection 180) dynamic real-world environment 168 without departing from the scope hereof. Dynamic real-world environment 168 is shown with a plurality of identified features 164(1)-(9) that correspond to objects 402(1)-(9), respectively, within environment 103 of FIG. 4. In this example, feature recognizer 170 of server 152, FIG. 1, selects matched ARBit 174 based upon identified feature 164(7), and thus display 114 shows a view of the portion of dynamic real-world environment 168 that contains features 164(3), 164(6), 164(7), and 164(8), and matched ARBit 174 near identified feature 164(7). In one example, within ARBit database 172, an ARBit has an image of a building that feature recognizer 170 matches to identified feature 164(7). In another example, within ARBit database 172, an ARBit has text that feature recognizer 170 matches to text on identified feature 164(7). In another example, within ARBit database 172, an ARBit has an associated color that feature recognizer 170 matches to a color of identified feature 164(7). In another example, within ARBit database 172, an ARBit has a logo (e.g., a graphic) that feature recognizer 170 matches to a logo of identified feature 164(7).

In the example of FIG. 5, display 114 also shows generic ARBit 175 positioned near identified feature 164(6) on display 114, where feature recognizer 170 adds generic ARBit 175 to ARBit collection 180 for dynamic real-world environment 168 based upon a current location of mobile device 102.

Figure 6:
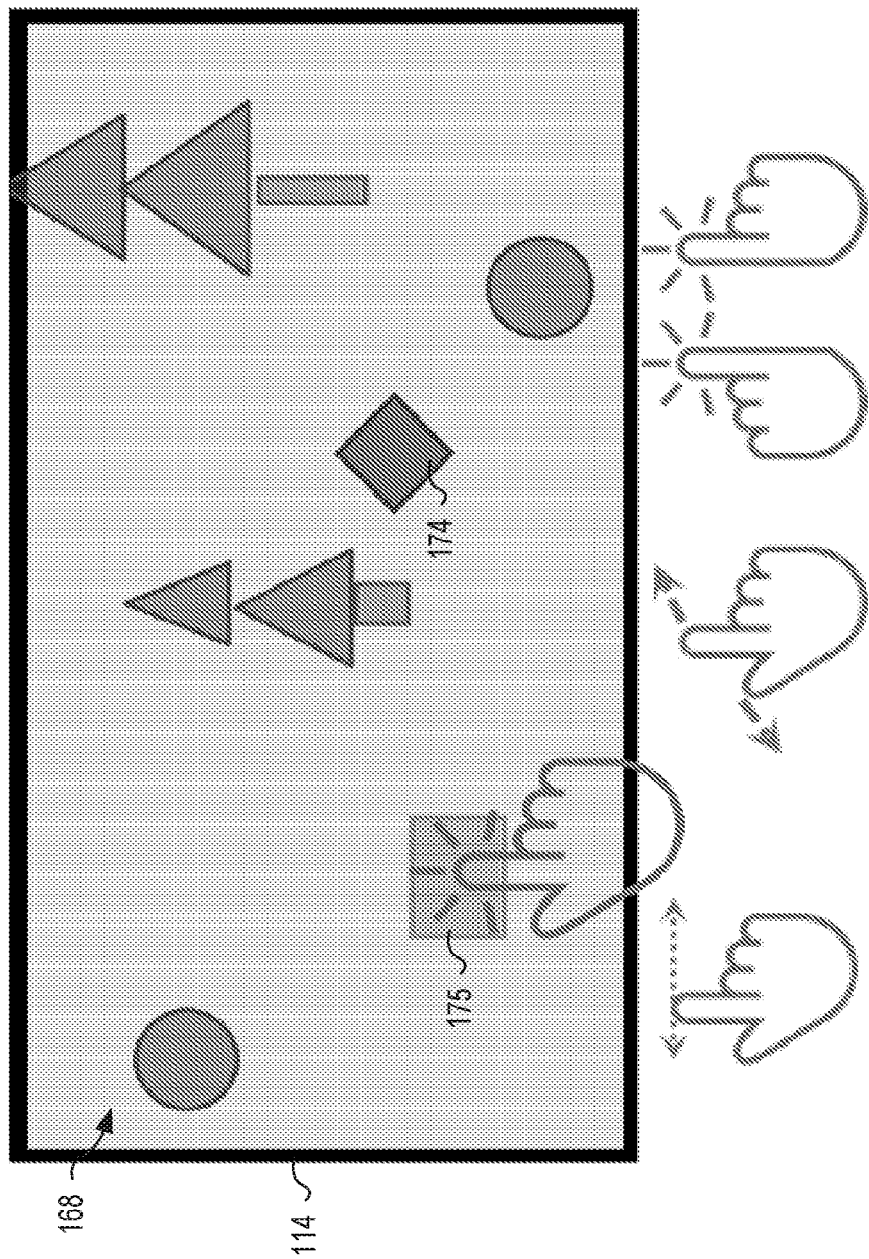
FIG. 6 shows example manipulation of the view of the dynamic real-world environment of FIG. 1 on the display of the mobile device.

The user may interact with mobile device 102 to change the view of dynamic real-world environment 168 and to select and/or interact with matched ARBit 174. FIG. 6 shows example manipulation of the view of dynamic real-world environment 168 on display 114 of mobile device 102. This view manipulation may include panning left, right, up and down, zooming in and out, multi-touch operations, and selecting matched ARBit 174 and/or generic ARBit 175. In certain embodiments, where mobile device 102 includes motion sensors (e.g., accelerometers and/or gyroscopes), the user may move mobile device 102 to change the view of dynamic real-world environment 168 on display 114.

Figure 7:
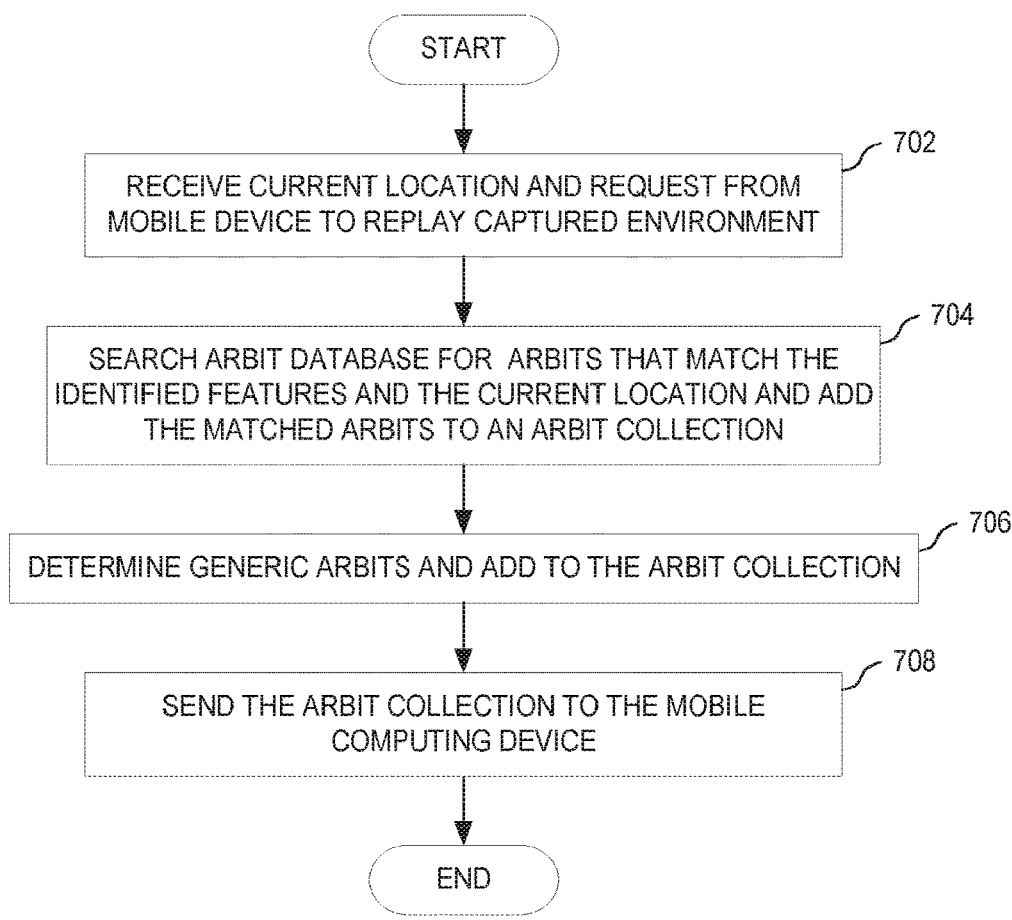
FIG. 7 is a flowchart illustrating one example method for replaying a previously captured environment, in an embodiment.

FIG. 7 is a flowchart illustrating one example method 700 for replaying a previously captured environment, in an embodiment. Method 700 is for example implemented within server 152 of FIG. 1.

In step 702, method 700 receives a current location and a request from a mobile device to replay a captured environment. In one example of step 702, the user of mobile device 102 interacts with app 120 to request replay of dynamic real-word environment 168, wherein app 120 utilizes locator 112 to determine a current location of mobile device 102 and sends the current location in a corresponding request to server 152. In step 704, method 700 searches an ARBit database for ARBits that match the identified features and the current location and adds the matched ARBits to an ARBit collection. In one example of step 704, feature recognizer 170 searches ARBit database 172 for ARBits that match each identified feature 164 and the current location, and adds any matched ARBits 174 to ARBit collection 180.

In step 706, method 700 determines generic ARBits and adds them to the ARBit collection. In one example of step 706, where feature recognizer 170 determines that too few matched ARBits 174 have been added to ARBit collection 180, feature recognizer 170 selects one or more generic ARBits 175 from ARBit database 172 based upon the current location of mobile device 102 and adds them to ARBit collection 180.

In step 708, method 700 sends the ARBit collection to the mobile computing device. In one example of step 708, server 152 sends ARBit collection 180 to mobile device 102 via interface 158, Internet 140, and interface 116, where they are received in step 206 of method 200, which then continues within mobile device 102 to replay the dynamic real-world environment.

Figure 8:
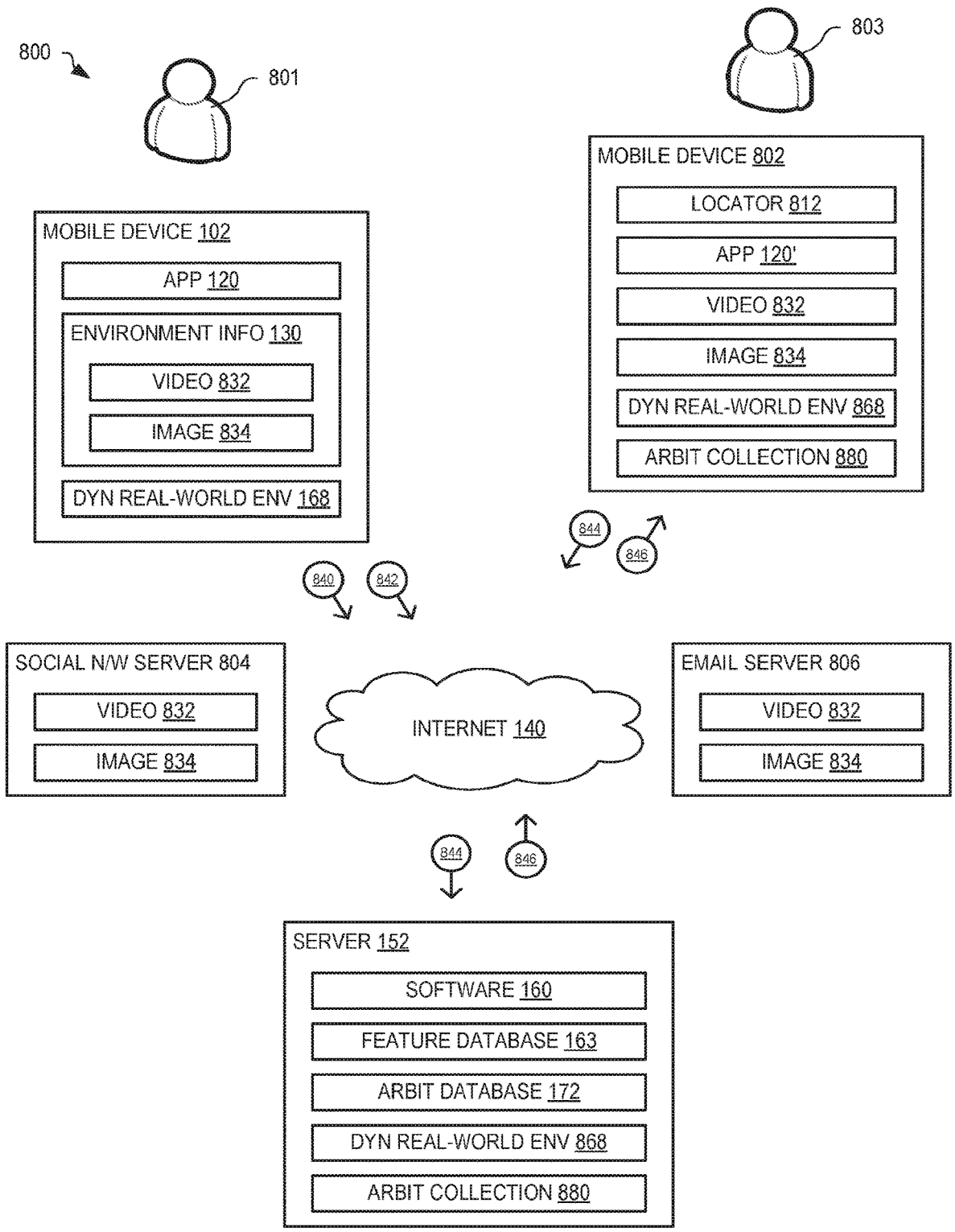
FIG. 8 is a functional schematic illustrating sharing of a dynamic real-world environment with another user, in an embodiment.

FIG. 8 is a functional schematic illustrating sharing of a dynamic real-world environment 168, generated by mobile device 102 and server 152 of FIG. 1, with a second user 803. First user 801 uses mobile device 102 to capture environmental information 130 for generating dynamic real-world environment 168, as described above. Where first user 801 wishes to share the experience with second user 803, first user 801 may share dynamic real-world environment 168 with second user 803 via any available communication medium. For example, user 801 may share dynamic real-world environment 168 with second user 803 by sending a message 840 containing dynamic real-world environment 168 to second user 803. In another example, first user 801 may share a video 832 and/or one or more images 834 from environment information 130 with second user 803 by sending a message 840 containing video 832 (and/or one or more images 834) to a social networking server 804 where it may be accessible by second user 803 (e.g., where second user 803 is a "friend" of first user 801). In another example, first user 801 may send an email 842 containing video 832 (and/or one or more images 834) to user 803 via an email server 806. First user 801 may share the video 832 and/or the one or more images 834 with second user 803 via other means without departing from the scope hereof.

Message 840, dynamic real-world environment 168, video 832, and/or images 834 may include metadata such as one or more of: timing information for when a target (e.g., a identified feature 164) appears in video 832, positional information for where the target is in video to facilitate display a corresponding ARBit 174/175, location information (e.g., GPS coordinates) of the target, an identity of a current user, an identity of an original author (e.g., first user 801), a count indicative of a number of times viewed (local), a date and time of replay creation, and a date and time of last view.

Upon retrieving or receiving video 832 and/or images 834, second user 803 may invoke an app 120' (e.g., a copy of the app 120) running on mobile device 802 to view video 832 and/or images 834. Accordingly, app 120' sends a request 844, including video 832 and/or images 834 and a current location of mobile device 802 as determined using a locator 812 for example, to server 152 via the Internet 140. In response to the request 844, software 160 of server 152 generates a dynamic real-world environment 868 and associated ARBit collection 880, based upon the current location, the video 832 and/or the images 834. For example, software 160 of server 152 uses feature database 163 and ARBit database 172 to generate dynamic real-world environment 868 and ARBit collection 880, using a method similar to method 300 of FIG. 3, described above. However, instead of using the location of mobile device 102, feature identifier 162, environment generator 166 and feature recognizer 170 of software 160 use the current location of the mobile device 802, received in the request 844, to determine ARBit collection 880. Accordingly, dynamic real-world environment 868 and ARBit collection 880 may not be identical to dynamic real-world environment 168 and ARBit collection 180. That is, dynamic real-world environment 868 and ARBit collection 880 are generated corresponding to the location of the mobile device 802.

When dynamic real-world environment 868 and/or video 832 is replayed, server 152 may generate ARBit collection 880 with different ARBits based upon currently available information. For example, where first user 801 viewed video 832 containing a first ARBit "A" while at a first location, when video 832 is dynamically replayed by second user 803 at a second location away from the first location, ARBit "B" may be viewed in place of ARBit "A". However, where video 832 is "static" (e.g., the dynamic real-world environment 868, video 832, and/or images 834 is/are not shared for dynamic replay), when replayed by second user 803, irrespectively of any change to their environment (e.g., at a different location), ARBit "A" is always displayed. That is, first user 801 may share video 832 and/or images 834 as they would any other video/image, such as when sharing captured moments of a vacation, etc.

The indication of whether the dynamic real-world environment 868, video 832, and/or images 834 are for dynamic or static replay may be included within the corresponding metadata, for example, wherein the server 152 may not be invoked for static replays. Where server 152 is invoke for a dynamic replay, server 152 evaluates the current data (e.g., current location, time, and so on) to generate ARBit collect 880 with ARBits that may differ from previous replays of dynamic real-world environment 868, video 832, and/or images 834. Accordingly, second user 803 may see real-life images overlaid with dynamic ARBits.

Figure 9:
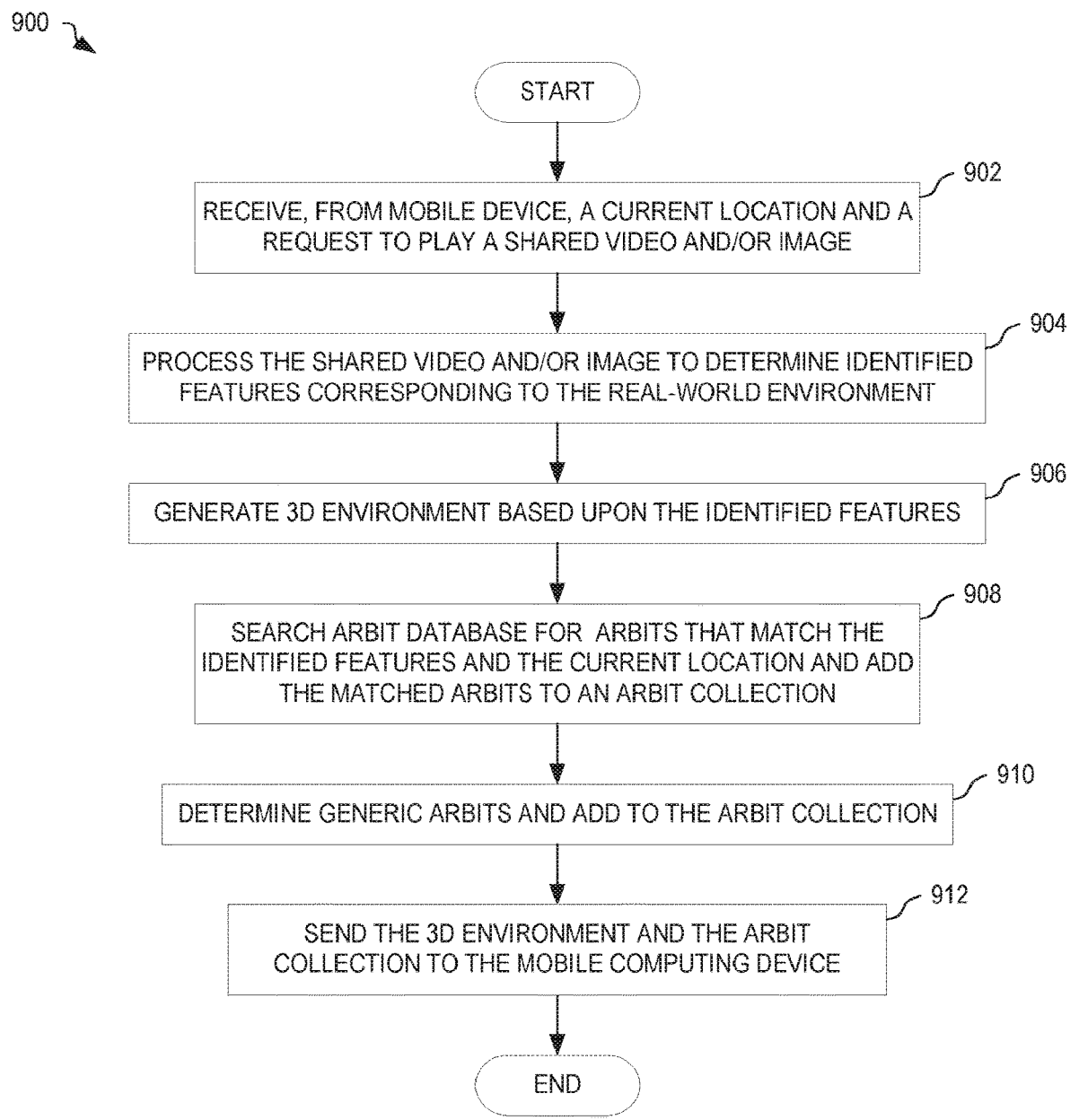
FIG. 9 is a flowchart illustrating one example method for replaying a shared real-world environment, in an embodiment.

FIG. 9 is a flowchart illustrating one example method 900 for replaying a shared real-world environment. Method 900 is for example implemented within the server 152 of FIGS. 1 and 8.

In step 902, method 900 receives a request to replay a shared video and/or image from a mobile device and a current location of the mobile device. In one example of step 902, after receiving video 832 from mobile device 102, second user 803 interacts with app 120' of mobile device 802 to request play of video 832, wherein app 120' utilizes locator 812 to determine a current location of mobile device 802 and sends request 844 to server 152. In step 904, the method 900 processes the shared video and/or image to determine identified features corresponding to the real-world environment. In one example of step 904, feature identifier 162 of software 160 processes video 832 and/or images 834 (and corresponding sounds) against feature database 163 to generate identified features 164.

In step 906, method 900 generates a 3D environment based upon the identified features. In one example of step 906, environment generator 166 of software 160 uses the identified features 164 of step 904 to generate dynamic real world environment 868. In step 908, method 900 searches an ARBit database for ARBits that match the identified features and adds the matched ARBits to an ARBit collection. In one example of step 908, feature recognizer 170 searches ARBit database 172 for ARBits that match each identified feature 164, and adds any matched ARBits 174 to ARBit collection 880.

In step 910, method 300 determines generic ARBits and adds them to the ARBit collection. In one example of step 910, where feature recognizer 170 determines that too few matched ARBits 174 have been added to ARBit collection 880, feature recognizer 170 selects one or more generic ARBits 175 from ARBit database 172 based upon the current location of mobile device 802 (received in request 844) and adds them to ARBit collection 880.

In step 912, method 900 sends the enhanced 3D environment and the ARBit collection to the mobile computing device. In one example of step 912, server 152 sends a message 846, including dynamic real-word environment 868 and ARBit collection 880, to mobile device 802 via Internet 140.

Within the mobile device 802, the app 120' displays, as described above, the dynamic real-word environment 868 and ARBit collection 880 on mobile device 802 for interaction with second user 803.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. In particular, the following embodiments are specifically contemplated, as well as any combinations of such embodiments that are compatible with one another:

(A) A method for displaying and interacting with a dynamic real-world environment, includes capturing information of an environment using one or more of a camera, a microphone, and a locator of a mobile computing device, sending the information to a server, receiving, from the server, the dynamic real-world environment and at least one ARBit, displaying a view of at least part of the dynamic real-world environment containing the ARBit to the user, manipulating the view based upon user input, and in response to selection of the ARBit within the view by the user, interacting with the user based upon a type of the ARBit.

The method of claim 1, the ARBit having an ARBit type selected from the group including game, image, video, coupon, sound, and link to a website.

(B) In the method denoted as A, the step of interacting includes, when the ARBit type of the ARBit is game, executing an interactive game and interacting with the user to play the game.

(C) In either of the methods denoted as (A) and (B), the step of interacting includes, when the ARBit type of the ARBit is image, displaying an image to the user.

(D) In any of the methods denoted as (A)-(C), the step of interacting includes, when the ARBit type of the ARBit is video, displaying a video to the user.

(E) In any of the methods denoted as (A)-(D), the step of interacting includes, when the ARBit type of the ARBit is coupon, displaying a coupon to the user.

(F) In any of the methods denoted as (A)-(E), the step of interacting includes, when the ARBit type of the ARBit is sound, playing a sound to the user.

(G) In any of the methods denoted as (A)-(F), the step of interacting includes, when the ARBit type of the ARBit is link to a website, displaying a selectable link to a website to the user.

(H) A method for generating a dynamic real-world environment with at least one interactive ARBit, includes receiving, from a mobile computing device, environment information captured from a real-world environment. The environment information is processed to determine identified features corresponding to the real-world environment, the dynamic real-world environment is generated based upon the identified features, and an ARBit database is searched for ARBits that match the identified features and adding the matched ARBits to an ARBit collection. The dynamic real-world environment and the ARBit collection are sent to the mobile device.

(I) The method denoted as (H), further includes, prior to the step of sending, determining one or more generic ARBits based upon at least one location defined within the captured information and adding the generic ARBits to the ARBit collection.

(J) In either of the methods denotes as (H) and (I), the matched ARBits and the generic ARBits each have an ARBit type selected from the group including game, image, video, coupon, sound, and link to a website.

(K) In any of the methods denoted as (H)-(J), the matched ARBits of the ARBit collection are embedded within the dynamic real-world environment.

(L) A method enhances, based upon a current location of a mobile device, a previously generated dynamic real-world environment. The method includes receiving, from a mobile device, a current location and a request to enhance the dynamic real-world environment, searching an ARBit database for ARBits that match previously identified features corresponding to the dynamic real-world environment and adding the matched ARBits to an ARBit collection, and sending the ARBit collection to the mobile device for replay within the dynamic real-world environment.

(M) The method denoted as (L) further including, prior to the step of sending, determining one or more generic ARBits based upon the current location and adding the generic ARBits to the ARBit collection.

(N) In either of the methods denoted as (L) and (M), one or more of the matched ARBits and the generic ARBits are embedded within the dynamic real-world environment.

(O) In any of the methods denoted as (L)-(N), the dynamic real-world environment being shared via social media.

(P) In any of the methods denoted as (L)-(N), the dynamic real-world environment being shared via email.

What is claimed is:

1. A method for enhancing replay of a dynamic real-world environment on a mobile device, the dynamic real-world environment generated as a three-dimensional model of a real-world environment, the method comprising:
   providing a single mobile device having a processor, memory, a display and software stored in said memory, said single mobile device being selected from the group consisting of a smartphone, a tablet and a laptop;
   capturing information of the real-world environment using a camera and a locator of the single mobile device;
   sending the information by said single mobile device to a server;
   said software including a feature identifier to generate one or more identified features corresponding to images captured by said camera;
   receiving, within the server and from the mobile device, a current location of the single mobile device and a request to enhance replay of the dynamic real-world environment;
   searching an ARBit database for a plurality of ARBits that each match at least one of a plurality of features identified in the information captured of the real-world environment, and adding the matched ARBits to an ARBit collection; and
   sending the ARBit collection to the single mobile device for replay within the dynamic real-world environment on the single mobile device;
   displaying a view on said display of the single mobile device of at least part of the dynamic real-world environment containing the ARBit collection to the user; and
   manipulating the view based upon user input made on the single mobile device, wherein the user input is a user selection on said display of one of said matched ARBit displayed within a view of said dynamic real-world environment.

2. The method of claim 1 wherein:
   the ARBit collection differs from a previously generated ARBit collection, corresponding to a previous location.

3. The method of claim 1, further comprising, prior to the step of sending:
   determining one or more generic ARBits based upon the current location of the single mobile device and adding the generic ARBits to the ARBit collection.

4. The method of claim 1, wherein:
   one or more of the matched ARBits and the generic ARBits are embedded within the dynamic real-world environment.

5. The method of claim 1, wherein the dynamic real-world environment is shared via social media or via email.

6. The method of claim 1, further comprising:
   prioritizing selection of one or more ARBits from the ARBit database for including in the ARBit collection based upon historical information collected by the server of how other users are responding to ARBits within their respective ARBit collections.

7. A method for enhancing replay of dynamic real-world environment on a mobile device, the dynamic real-world environment generated as a three-dimensional model of a real-world environment from a previous location and information captured of the real-world environment, the method comprising:
   providing a single mobile device having a processor, memory, a display and software stored in said memory, said single mobile device being selected from the group consisting of a smartphone, a tablet and a laptop;

capturing information of the real-world environment using a camera and a locator of the single mobile device;

sending the information by the single mobile device to a server;

said software including a feature identifier to generate one or more identified features corresponding to images captured by said camera;

receiving, within the server and from the single mobile device, a current location of the single mobile device and a request to enhance replay of the dynamic real-world environment;

providing an ARBit database for a plurality of ARBits that match at least one of a plurality of features identified in the information captured of the real-world environment and adding matched ARBits to an ARBit collection;

sending the ARBit collection to the single mobile device for replay within the dynamic real-world environment; and wherein the ARBit collection differs from another ARBit collection corresponding to a previous location;

displaying a view on said display of the single mobile device of at least part of the dynamic real-world environment containing the ARBit collection to the user; and manipulating the view based upon user input made on the single mobile device, wherein the user input is a user selection on said display of one of said matched ARBit displayed within a view of said dynamic real-world environment.

8. The method of claim 7, further comprising:

prior to the step of sending, determining one or more generic ARBits based upon the current location of the single mobile device and adding the generic ARBits to the ARBit collection.

9. The method of claim 7, wherein one or more of the matched ARBits are embedded within the dynamic real-world environment.

10. The method of claim 9, wherein the dynamic real-world environment was shared via social media.

11. The method of claim 9, wherein the dynamic real-world environment was shared via email.

12. The method of claim 7, further comprising:

prioritizing selection of one or more ARBits from the ARBit database for including in the ARBit collection based upon historical information collected by the server of how other users are responding to ARBits within their respective ARBit collections.

13. A method for enhancing replay of a dynamic real-world environment on a single mobile device, the dynamic real-world environment generated as a three-dimensional model of a real-world environment, the method comprising:

providing a single mobile device having a camera, a microphone, a locater, a display, a processor, a memory, a display and software stored in said memory, said single mobile device being selected from the group consisting of a smartphone, a tablet and a laptop;

capturing information of the real-world environment using the camera and the locator of the single mobile device;

sending the information to a server;

said software including a feature identifier that processes environment information against a feature database to generate one or more identified features corresponding to images captured by said camera;

receiving, within the server and from the single mobile device, a current location of the single mobile device and a request to enhance replay of the dynamic real-world environment;

searching an ARBit database for a plurality of ARBits that each match at least one of a plurality of features identified in the information captured of the real-world environment, and adding the matched ARBits to an ARBit collection; and sending the ARBit collection to the single mobile device for replay within the dynamic real-world environment;

displaying a view on said display of the single mobile device of at least part of the dynamic real-world environment containing the ARBit collection to the user; and manipulating the view based upon user input made on the single mobile device, wherein the user input is a user selection on said display of said matched ARBit displayed within a view of said dynamic real-world environment.

* * * * *